United States Patent
Suzuki et al.

(10) Patent No.: US 6,882,342 B2
(45) Date of Patent: Apr. 19, 2005

(54) IMAGE PROCESSING METHOD, IMAGE PROCESSING PROGRAM, AND IMAGE PROCESSING APPARATUS

(75) Inventors: Atsushi Suzuki, Shibuya-ku (JP); Takashi Nakamura, Shibuya-ku (JP)

(73) Assignee: Konami Corporation, Tokyo (JP)

( * ) Notice: Subject to any disclaimer, the term of this patent is extended or adjusted under 35 U.S.C. 154(b) by 202 days.

(21) Appl. No.: 10/157,714

(22) Filed: May 29, 2002

(65) Prior Publication Data

US 2002/0180730 A1 Dec. 5, 2002

(30) Foreign Application Priority Data

May 30, 2001 (JP) ...................................... 2001-162171

(51) Int. Cl.[7] .............................................. G06T 15/00
(52) U.S. Cl. ..................................................... 345/422
(58) Field of Search ............................... 345/420, 421, 345/422, 419

(56) References Cited

U.S. PATENT DOCUMENTS 5,577,170 A * 11/1996 Karow ...................... 358/1.11
5,933,156 A * 8/1999 Margolin .................... 345/545
6,603,474 B1 * 8/2003 Cobb et al. ................. 345/421

FOREIGN PATENT DOCUMENTS

EP         1 094 421         4/2001

OTHER PUBLICATIONS

Takafumi Saito et al: "Comprehensible Rendering of 3–D Shapes" Computer Graphics, New York, NY, US, vol. 24, No. 4, Aug. 1, 1990, pp. 197–206, XP000255785 ISSN: 0097–8930 * figure 9 *.

* cited by examiner

Primary Examiner—Phu K. Nguyen
(74) Attorney, Agent, or Firm—Jordon and Hamburg LLP

(57) ABSTRACT

In an image processing method to form a predetermined image with an image processing unit having a frame-buffer and z-buffer corresponded to the frame-buffer, a main-model and a sub-model containing at least one part of the main model are arranged at a predetermined position in a virtual 3-dimensional space. The sub-model is rendered in the frame-buffer in a write-protected state to the z-buffer, after that, the main-model is rendered in the frame-buffer in a released write-protected state to the z-buffer and updating a memory content of the z-buffer according to depth information that the main model has.

15 Claims, 5 Drawing Sheets

MAIN-MODEL

SUB-MODEL

AFTER RENDERING

IMAGE PROCESSING METHOD, IMAGE PROCESSING PROGRAM, AND IMAGE PROCESSING APPARATUS

BACKGROUND OF THE INVENTION

The present invention relates to image processing method and image processing programs using computer graphics technology.

The method rendered in JP-A-2000-251094 has been already known as an image processing method to render the outline of a model emphatically. In this method, a first-model and a second-model, slightly bigger than the first one, are prepared to render one model. A normal vector of a polygon constituting the second-model is made turn over to the normal vector of the polygon corresponded to the first-model. The first-model is rendered so that it is contained by the second-model. At the moment of the rendering, a hidden surface (the hidden part in view of the view point) of each model is specified according to a inner product of the normal vector and an eyes vector of each model, the specified hidden surface is excluded from the object to be rendered. Therefore, about the second model, only the outside part of the first-model is rendered. As a result, the second-model is visible as the outline of the first model.

The above mentioned method is that each model is divided into the parts to be rendered or not to be rendered according to the normal vector of each polygon, after that, only the part to be rendered is rendered on a drawing memory. Therefore, the processing amount when models are rendered on the drawing memory (rendering) decreases, but the processing amount before the rendering increases. On a conventional image processing unit carried by a game machine and the like, compared with the drawing processing, the unit has the high ability of a vector operation processing and the like as the preprocessing, therefore, as above mentioned, it is effective for the improvement of processing speed that the normal vector operation for every model and the like are executed in order to reduce the number of polygons to be rendered in the memory.

However, by the improvement of the computer-processing ability of late years the performance of the rendering engine carried by game machines has been extremely improved. So, it is sometimes more advantageous for the improvement of processing speed to exclude such as the preprocessing as much as possible than to execute the special preprocessing to reduce the number of polygons to be rendered.

Furthermore, in the method of the bulletin, as the processing to make the normal vector of the second-model turn over based on the polygon-data of the first-model is essential, the shape of the second-model is restricted to the shape with some geometric relation (for typical example, a similar figure) to the first-model. So, the flexibility of representation by the second-model is small.

In the image processing using computers, a z-buffer algorithm has been already known as a method to render a plural number of models arranged in the virtual 3-dementional space while maintaining their order relations correctly. In this method, the special buffer-memory area (called z-buffer) having the drawing area which is similar to a frame-buffer is reserved in the drawing memory and in the z-buffer a depth information in view of the view point of a model rendered in the frame-buffer is recorded by every pixel. When the new model is rendered in the frame-buffer, the depth information of each pixel of the model for rendering is compared with the depth information recorded in the z-buffer. Only the part of the model for rendering where the depth information is smaller (i.e. closer in view of the view point) than the one in z-buffer is newly rendered in the frame-buffer. As this z-buffer algorithm doesn't require the vector operation performed in the hidden-surface removal method using the normal vector, the judgment of the order-relation can be executed at high speed.

SUMMARY OF THE INVENTION

Therefore, it is an object of the present invention to provide, in place of a hidden surface judgment according to a normal vector, an image processing method that makes it possible to render a required image on a periphery of a model by using a z-buffer and a program to realize the method.

In order to achieve the above object, the present invention is to provide an image processing method to form a predetermined image with an image processing unit having a frame-buffer and z-buffer corresponded to the frame-buffer, in which the method has the steps of arranging a main-model and a sub-model containing at least one part of the main model at a predetermined position in a virtual 3-dimensional space, describing the sub-model to the frame-buffer in a write-protected state to the z-buffer, and updating a memory content of the z-buffer according to depth information that the main model has, while describing the main-model to the frame-buffer in a released write-protected state to the z-buffer.

According to the present invention, as the writing into the z-buffer is protected when the sub-model is rendered in the frame-buffer, the value of z-buffer is not updated by the depth information of the sub-model. Therefore, when the main-model is rendered in the frame-buffer after the rendering of the sub-model, about parts looking overlapped with the main-model and the sub-model in view of the viewpoint, the image data of the sub-model rendered in the frame-buffer are overwritten by the main-model. On the other hand, about parts of the main-model the sub-model contains, the periphery of the sub-model is not overwritten by the main-model, and remains in the frame-buffer. The remaining part is represented as the outline and the like on the periphery of the main-model.

The image processing method according to the present invention may have the steps, before the rendering of the sub-model, of describing a background, to be arranged behind the main-model and the sub-model in the virtual 3-dimentional space in view of a predetermined view point, in the frame-buffer and updating the memory content of the z-buffer according to depth information of the background prior to the rendering of the sub-model. In this case, the background rendered in the frame-buffer is overwritten by the sub-model and furthermore the one part of the sub-model is overwritten by the main-model, so, the background and the sub-model can be rendered keeping their order relation correctly.

An image processing program according to the present invention achieves the above object by an image processing program for forming a predetermined image by a computer having a frame-buffer and a z-buffer corresponded to the frame-buffer, in which the program is constructed to make the computer execute the procedures of arranging a main-model and a sub-model including at least one part of the main-model in a virtual 3-dimensional space at a predetermined position, and rendering the sub-model to the frame buffer in a write-protected state to the z-buffer, and rendering the main-model to the frame buffer in a released write-protected state to the z-buffer and updating a memory content of the z-buffer according to depth information the main model has.

When this image processing program is executed by a computer, that makes it possible that the computer function as an image processing unit to realize the image processing method according to the present invention.

Additionally, before the rendering of the sub-model, the image processing program according to the present invention may be constructed to make a computer execute a procedure of rendering a background, to be arranged behind the main-model and the sub-model in the virtual 3-dimentional space in view of a predetermined view point, to the frame buffer and updating the memory content of the z-buffer according to depth information of the background prior to the rendering of the sub-model.

The present invention may be realized as an image processing apparatus for forming a predetermined image, comprising the video memory having a frame-buffer and z-buffer corresponded to the frame-buffer, a device for arranging a main-model and a sub-model containing at least one part of the main model in a virtual 3-dimensional space at a predetermined position, a device for rendering the sub-model to the frame buffer in a write-protected state to the z-buffer, and a device for rendering the main-model to the frame buffer in a released write-protected state to the z-buffer and updating a memory content of the z-buffer according to depth information the main model has, and furthermore, before the rendering of the sub-model, the image processing apparatus may comprise a device for updating the memory content of the z-buffer according to the depth information of the background with rendering the background arranged behind the main-model and the sub-model in the virtual 3-dimentional space in view of a predetermined viewpoint in the frame-buffer.

According to the present invention, it isn't required the process premising the geometric correlativity of the both models to make the normal of the sub-model turn over to the main-model. Therefore, each shape of the main-model and the sub-model can be determined freely, and a various shape image can be appeared on the periphery of the main-model by the sub-model as a non-similar figure. The sub-model can be also appeared only at a part of the periphery of the main-model by making at least a part of the main-model extend off the sub-model.

The program according to the present invention may be offered to users in recorded state in a storage medium and may be distributed to users through some wired or wireless network.

DESCRIPTION OF THE PREFERRED EMBODIMENTS

Figure 1:
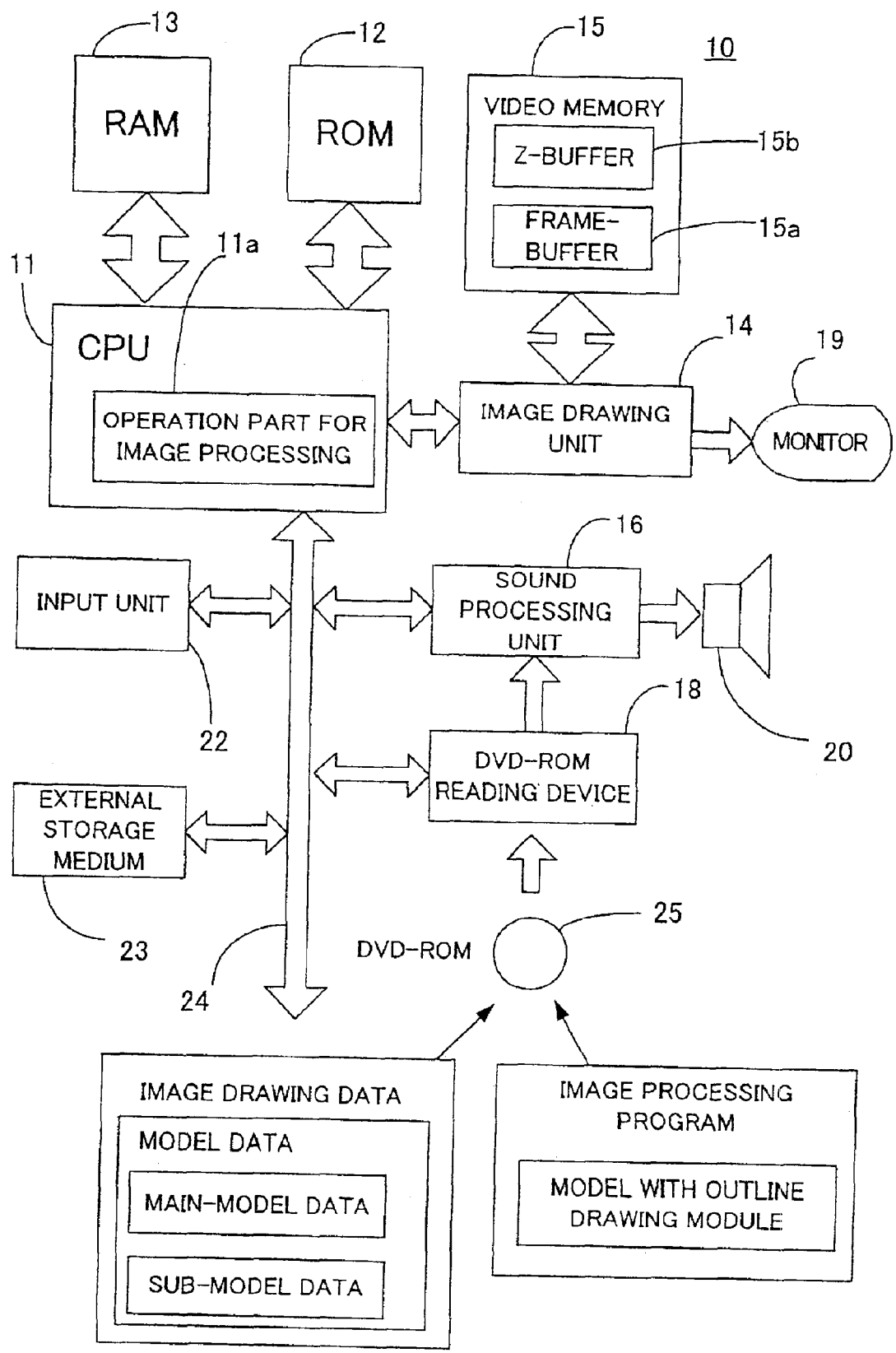
FIG. 1 is a block chart of an image processing unit to execute an image processing according to the present invention.

FIG. 1 is a block chart about an image processing unit according to one embodiment for carrying out the present invention. An image processing unit 10 is constructed as a computer for executing a predetermined image rendering process according to an image processing program recorded in a storage medium 25 (for example, DVD-ROM). The image processing unit 10 has a CPU 11 constructed mainly by a microprocessor, a ROM 12 and a RAM 13 as a main memory unit for the CPU 11, an image processing unit 14 and a sound processing unit 16 which execute the appropriate processing to image processing and sound processing according to the instruction of the CPU 11, and a DVD-ROM reading device 18 for reading programs and data from the DVD-ROM 25 as a storage medium. The operating system as the program required to control the whole action of the image processing unit 10 is written in the ROM 12. The programs and data read from the DVD-ROM 25 as a storage medium are written in the RAM 13 depending on need.

The CPU 11 has an image processing operation part 11a to execute geometry processing such as a polygon geometric transformation and a vector operation and the like on so-called 3-dementional computer graphics. This image processing operation part 11a is constructed, for example, by the combination of the microprocessor and the specified software.

On the other hand, the image processing unit 14 executes the so-called rendering process to receive polygon data and the like from the CPU 11 and render them in a video memory 15 and creates a video playing signal constructing one frame according to the image data of which the rendering has been carried out in the video memory 15, and outputs the video playing signal to a monitor 19 in a predetermined timing. In the video memory 15, a frame-buffer 15a and a z-buffer 15b are reserved. In the frame-buffer 15a, the rendering of one frame image to be displayed on the monitor 19 is carried out. The Z-buffer 15b is the similar rendering area to the frame-buffer 15a, where a depth information of a model rendered in the frame-buffer 15a is recorded by every pixel. The depth information relates to the Z-coordinate of each pixel on the polygon when a 3-dementional rectangular coordinates system is set, where an optical axis direction of a virtual camera is regarded as Z-axis in the virtual 3-dimentional space.

The depth information is recorded into the Z-buffer in parallel with the rendering of the model onto the frame-buffer 15a. However, when a predetermined mask instruction is given from the CPU 11, the image processing unit 14 protects the writing into the Z-buffer 15b. Even if in the write-protected state, the depth information of the model required to render and the depth information recorded in the Z-buffer 15b are compared by a pixel unit, and about portion in the rear of the model already rendered and hidden by it, the information of the frame-buffer 15a is not updated. These functions of the Z-buffer have been already implemented popularly, for example, on the field of the comparatively low-priced computers for a personal use such as video game machines for family use or personal computers, so the explanation is omitted here.

On the FIG. 1, There is the video memory 15 set as memory specialized in rendering for the image processing unit 14, but a video memory can be reserved on the RAM 13 as the main memory. Which operation the CPU 11 and the image processing unit 14 execute depends on the hardware construction, so the present invention is not restricted to the above construction.

The sound processing unit 16 plays data of voice and music read from the DVD-ROM 25 and sound source data and the like, and makes them output from a speaker 20. A reading device 18 reads the programs and data recorded in the DVD-ROM 25 according to the instruction from the CPU 11, and outputs the signal corresponding to the read contents.

Furthermore, the CPU 11 is connected with an input unit 22 and an external storage medium 23 through a bus 24 respectively. The external storage medium 23 is one of a rewritable storage medium such as a semiconductor memory of non-volatility, a hard disk and a magnet-optical disc. The mentioned construction is only one example, so the construction of the computer which executes the image processing method of the present invention may be changed properly. In addition, the connection embodiment of each unit to the CPU 11 is not restricted to the FIG. 1.

An image processing program recorded in the DVD-ROM 25 as a storage medium includes a rendering module for model with outline to render models with outline according to the present invention. And, in the DVD-ROM 25, the image rendering data needed for rendering various kinds of models are recorded according to the image processing program. The data includes the model data used for rendering the 3-dimentional image according to the above mentioned image processing program. The model data is set by every model or by every part into which the model is divided. Each of the model data and the part data includes the information such as the peak coordinates of the plural number of polygons constructing models. The model data used for rendering the model with outline according to the above mentioned rendering module for models with outline include both main-model data and sub-model data. The difference between them is mentioned later.

Figure 2:
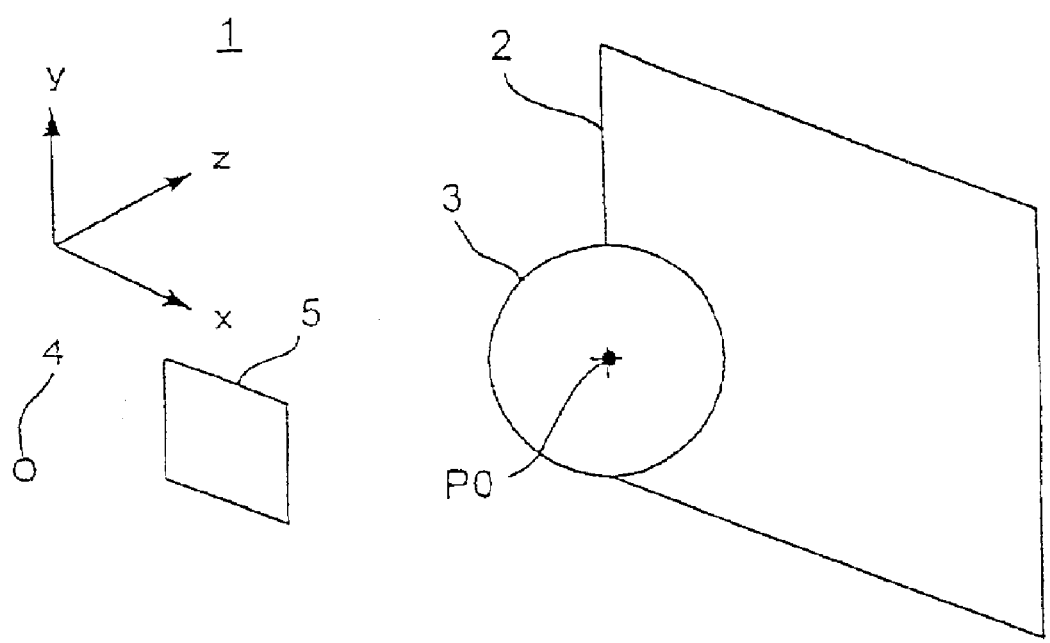
FIG. 2 is a view showing the state a model applied the image processing according to the present invention is arranged in the virtual 3-dimentional space.
Figure 3:
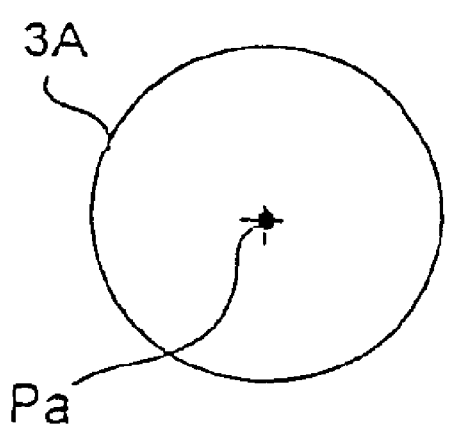
FIG. 3 is a view showing a main-model and a sub-model prepared to render the model of FIG. 2 as the model with outline and an image created by composing them.
Figure 3:
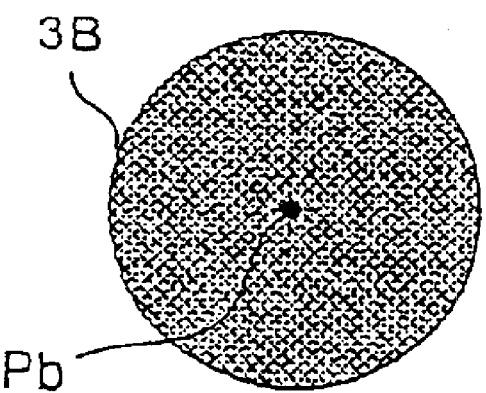
Figure 3:
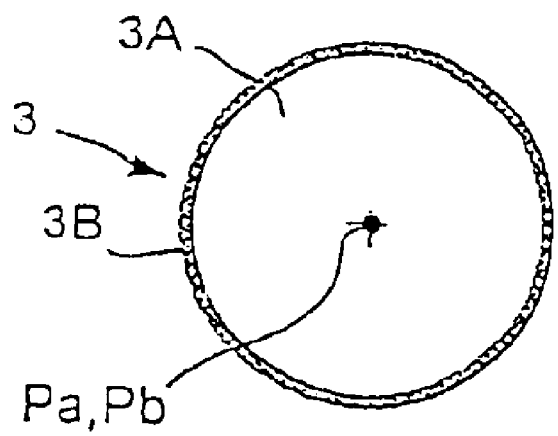

Next, with reference to FIG. 2 and FIG. 3, the outline of the process according to the rendering module for models with outline is explained below. FIG. 2 shows the built 3-dimentional scene where a background 2 and a globular model 3 respectively arranged in a virtual 3-dimentional space 1. A viewpoint 4 and a virtual screen 5 are established in the virtual 3-dimentional space 1. The construction of the 3-dimentional scene, the setting of the viewpoint 4 and the like is executed by the CPU 11, for example, with reference to the instruction of the input unit 22. After the scene construction and the viewpoint setting are completed, the image is created, which the background 2 and the model 3 are projected on the virtual screen 5 in view of the viewpoint 4 (perspective transformation), and the projected 2-dementional image is rendered in the frame-memory 15*a*. Such a series of processing is executed according to the operating-system which is recorded in the ROM 12 and the image processing program. Additionally the model 3 is constructed by the combination of lots of polygons, but the illustration of these polygons is omitted. Whichever a model or texture is permitted as the background 2. Also the plural number of the background 2 are permitted.

Now, the case that the model 3 shown in FIG. 2 is displayed as a model with outline is explained below. In this case, referring to the FIG. 3, in the DVD-ROM 25 the data corresponded to the globular main-model 3A and the data corresponded to the globular sub-model 3B which is slightly bigger than the main-model 3A are recorded as main-model data and sub-model data respectively. And when these models 3A, 3B are rendered in the frame-buffer 15*a*, firstly the sub-model 3B is rendered, after that the main-model 3A is rendered to cover over the sub-model 3B. By this the sub-model 3B remains as a narrow annular shape around the main-model 3A after the rendering. This causes that the model 3 with outline can be displayed.

Additionally, the position of the model 3 in the virtual 3-dimentional space 1 is specified as the coordinates of the representative point P0 of the model 3 in the world coordinates system set in the virtual 3-dimentional space 1, and on the other hand, the peak coordinates of the polygons constructing the main-model 3A and the sub-model 3B on the model data are specified according to the local coordinates system which treats the appropriate representative points Pa and Pb set on each model as the basic point (for example, the origin). To display the main-model 3A and the sub-model 3B on the virtual screen 5, as the premise of it, it is needed that each model 3A and 3B is arranged in the virtual 3-dimentional space 1 according to the coordinate of the representative point P0 in the world coordinates system, which is given to the model 3 after the composition. So, it is preferable that the relation of the representative points P0, Pa, and Pb is set in order to get the model 3 combined by the main-model 3A and the sub-model 3B with the predetermined relation only by arranging the main-model 3A and the sub-model 3B in the virtual 3-dimentional space to make each representative points Pa and Pb agree with each representative point P0. For example, when the maim-model 3A and the sub-model 3B are similar figures, the representative points P0, Pa, Pb can be agreed with the center of gravity of each model. However, the present invention is not restricted to the example such as the position relation, but any position relation can be set as long as the correspondence relation among the model 3 position indicated in the world coordinates system, the main-model 3A and the sub-model 3B is clear.

The difference of a size between the main-model 3A and the sub-model 3B may be determined to render the outline as appropriate width around the main-model 3A. Besides, when the model color is set in model-data, about the main-model 3A, appropriate color can be set. On the other hand, about the sub-model 3B data, the appropriate color as the outline, for example black, dark gray and the like, may be set.

Figure 4:
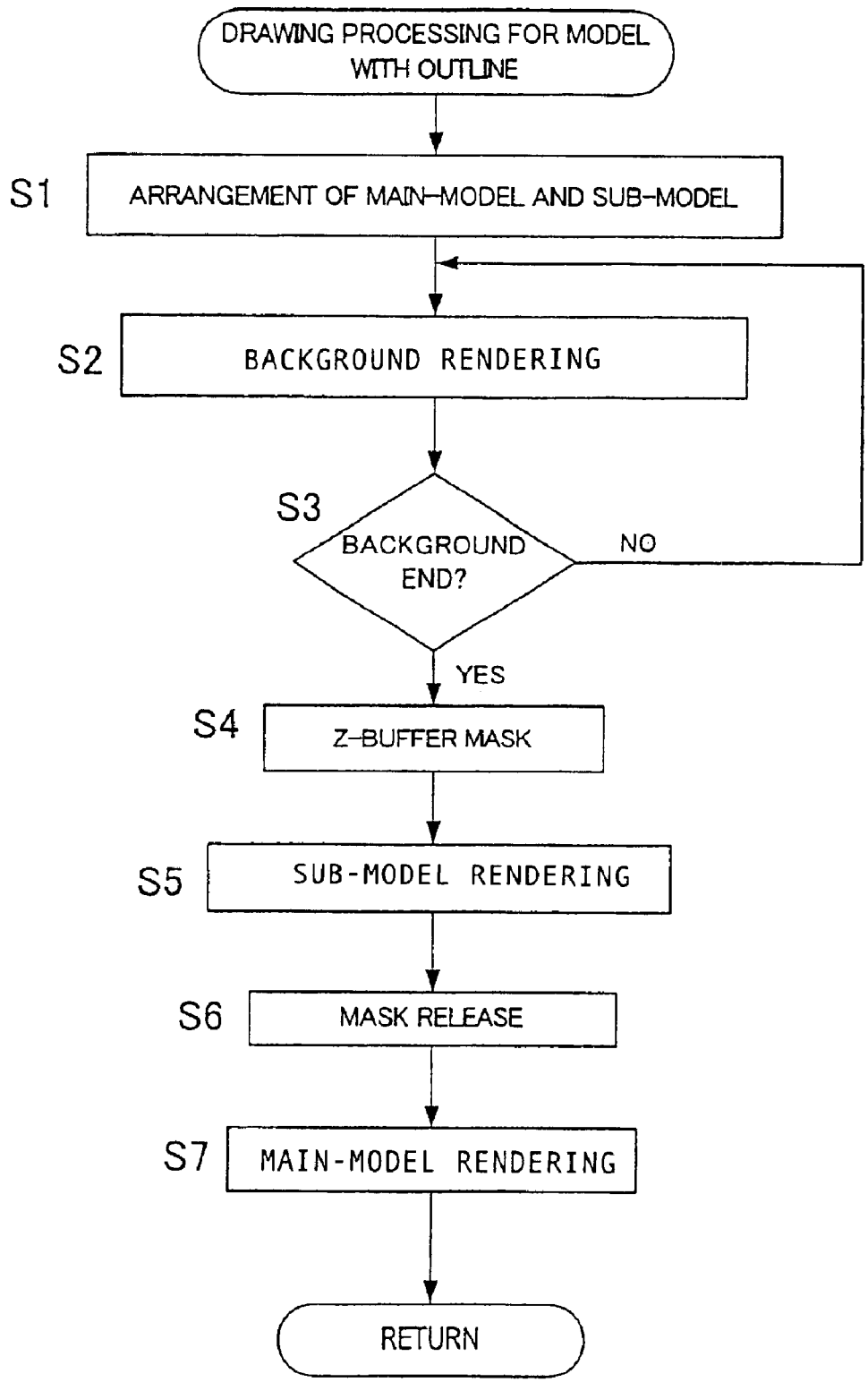
FIG. 4 is a flow chart showing the procedure of the model drawing processing with outline to be executed by the image processing unit of FIG. 1.

FIG. 4 is the flow chart to show the procedure of the model with outline drawing processing which the image processing unit 10 executes according to the outline drawing module of the image processing program. In this process, firstly, in the virtual 3-dimentional space 1 the main-model 3A and the sub-model 3B are arranged (step S1). Namely, according to the representative point P0 of the model 3 in the world coordinates system, the peak coordinate of the polygon constructing each of the main-model 3A and the sub-model 3B is converted to the value in the world coordinates system from the value in the local coordinates system which is unique for each of the model 3A and 3B. Besides, the polygon coordinate in the world coordinates system is converted to the coordinate in the viewpoint coordinates system where the photography direction from the viewpoint 4 is made agree with the z-axis direction. Therefore, the depth information of the model 3A and 3B from the viewpoint 4 can be acquired. After the arrangement of the main-model 3A and the sub-model 3B is completed, continuously the procedure to render the background 2, which has been already arranged behind the model 3, in the frame-buffer 15*a* (step S2) is executed.

When the rendering of the background 2 is completed, the condition of the step 3 is satisfied, and the rendering of the model 3 into the frame-buffer 15*a* starts. In the rendering of the model 3, firstly, a mask instruction is given to the z-buffer 15*b* and the z-buffer 15*b* is set in write-protected state (step S4). Next, the sub-model 3B constructing the model 3 with outline is rendered in the frame-buffer 15a (step S5). At this moment, the z-buffer 15b is write-protected, but the depth information which has been already recorded in the z-buffer 15b is compared with the depth information of the sub-model 3B by a pixel unit, and in the sub-model 3B, the only parts judged to have the smaller depth information than the one recorded in the z-buffer 15b are rendered in the frame-buffer 15a.

Continuously, the mask to the z-buffer 15b is released (step S6), after that, the main-model 3A is rendered in the frame-buffer 15a (step S7), and when the rendering finishes, the procedures shown in the FIG. 4 are completed (step S7). When the main-model 3A is rendered, the depth information recorded in the z-buffer 15a is compared with the one of the main-model 3A, and the only parts of the main-model 3A located before the background 2 and other models which have been already rendered are rendered in the frame-buffer 15a, and about the parts to be rendered the depth information of the z-buffer 15a is updated to the depth information of the main-model 3A. Besides, the depth information of the sub-model 3B is not recorded in the z-buffer 15b, so the inconvenience that the main-model 3A is not rendered by the order comparison between the sub-model 3B already rendered and the main-model 3A doesn't happen.

Figure 5A:
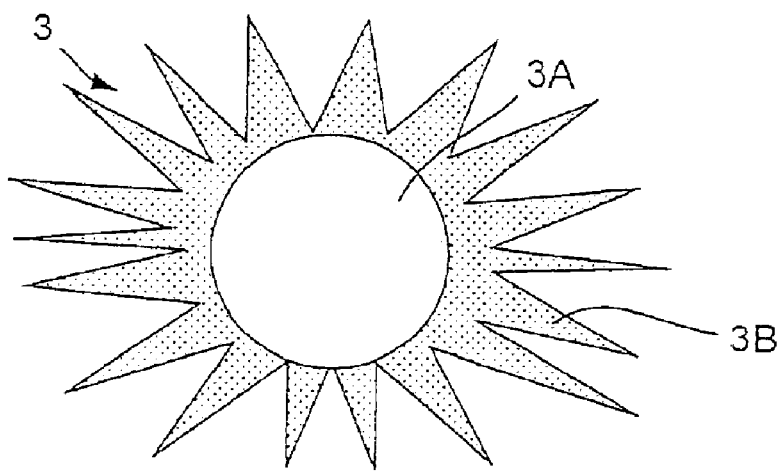
FIGS. 5A to 5C are views showing other examples of the representation of the model with outline.
Figure 5B:
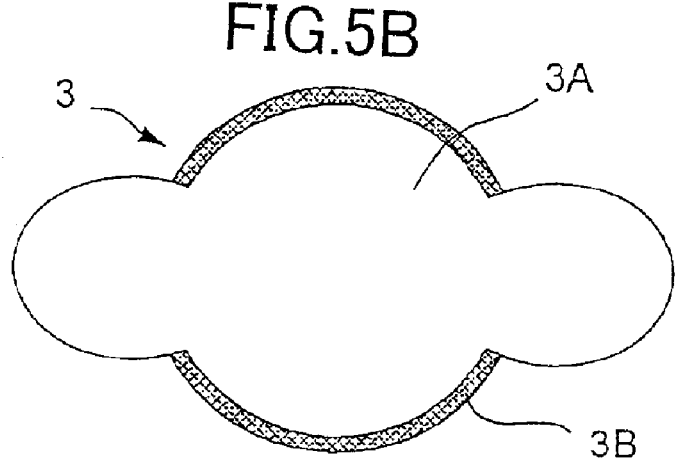
Figure 5C:
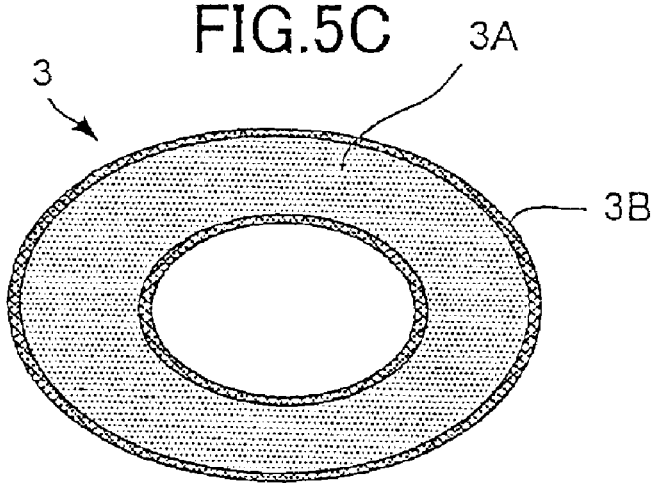

The present invention is not restricted to the above embodiment, but various embodiments are possible. For example, the main-model 3A and the sub-model 3B are not restricted to be global shape, but they can be the various shape. When the outline on the periphery of the main-model is rendered evenly, the main-model and the sub-model are required to be similar figures each other, but according to the present invention, not only such as the rendering of the outline, the rendering of the image to provide various visual effects is possible especially by the main model and the sub model to be formed as un-similar figurers. For example, as shown in FIG. 5A, the aureole around the main-model 3A can be represented by the sub-model 3B and as shown in FIG. 5B, the outline and the like can be partly represented when the only one part of the main-model 3A gets contained by the sub-model 3B. Besides, as shown FIG. 5C, when the main-model 3A has the hollow part such as a doughnut shape, the sub-model 3B can be represented on the side of the inner circumference, not only on the side of the perimeter.

In the above embodiment, data to specify the main-model and the sub-model respectively have been already recorded in the storage medium beforehand, but when there is a fixed correlation between the main-model and the sub-model, by using the correlation the sub-model data can be created dynamically from the main-model data. For example, when the sub-model is a similar figure of the main-model, the sub-model data can be created only by the way of expanding the peak coordinate of the polygon constructing the main-model by a fixed ratio. Also when the sub-model can be created by the way of executing a processing to the main-model, the sub-model can be created dynamically to the main model.

As the above explanation, according to the present invention, before the main-model rendering to the frame-buffer, the sub-model rendering gets rendered into the frame-buffer in the write-protected to the z-buffer state and after that, as judging the order relation by using the z-buffer the main-model rendering into the frame-buffer is executed. So, even if both of the sub-model and the main-model are rendered into the frame-buffer without the vector operations and the like before the rendering, on the part where the main-model and the sub-model overlap, the main-model rendering is given priority and on the periphery of the main-model the image that the sub-model is represented can be formed certainly.

What is claimed is:

1. An image processing method for forming a predetermined image with an image processing unit having a frame-buffer and a z-buffer corresponded to the frame-buffer, wherein the method comprises the steps of:

arranging a main-model and a sub-model containing at least one part of the main-model at a predetermined position in a virtual three dimensional space;

rendering the sub-model into the frame-buffer under a state wherein the z-buffer is entirely write-protected; and rendering the main-model into the frame-buffer under a state wherein the write-protect of the z-buffer is released and updating a memory content of the z-buffer according to depth information of the main-model.

2. The image processing method according to claim 1, wherein the method comprises the step of:

rendering a background, to be arranged behind the main-model and the sub-model in the virtual three dimensional space in view of a predetermined view point, into the frame-buffer, and updating the memory content of the z-buffer according to depth information of the background prior to the rendering of the sub-model.

3. The image processing method according to claim 1, wherein the sub-model is constituted by a size which can give an outline having predetermined width to a periphery of the main-model.

4. The image processing method according to claim 1, wherein the sub-model is an un-similar figure of the main-model.

5. The image processing method according to claim 1, wherein at least one part of the main-model extends off the sub-model.

6. An image processing program for forming a predetermined image with a computer having a frame-buffer and a z-buffer corresponded to the
frame-buffer, wherein the program is executable and constructed to make the computer execute the procedures of:

arranging a main-model and a sub-model containing at least one part of the main-model at a predetermined position in a virtual 3-dimensional space;

rendering the sub-model into the frame-buffer under a state wherein the z-buffer is entirely write-protected; and rendering the main-model into the frame-buffer under a state wherein the write-protect of the z-buffer is released and updating a memory content of the z-buffer according to depth information of the main-model.

7. The image processing program according to claim 6, wherein the program is constructed to make a computer execute the procedures of:

rendering a background, to be arranged behind the main-model and the sub-model in the virtual three dimensional space in view of a predetermined view point, into the frame-buffer; and updating the memory content of the z-buffer according to depth information of the background prior to the rendering of the sub-model.

8. The image processing program according to claim 6, wherein the sub-model is constituted by a size which can give an outline having a predetermined width to a periphery of the main-model.

9. The image processing program according to claim 6, wherein the sub-model is an un-similar figure of the main-model.

10. The image processing method according to claim 6, wherein at least one part of the main-model extends off the sub-model.

11. An image processing apparatus for forming a predetermined image, comprising:
  a video memory having a frame-buffer and a z-buffer corresponded to the frame-buffer,
  a device for arranging a main-model and a sub-model containing at least one part of the main-model at a predetermined position in a virtual three dimensional space;
  a device for rendering the sub-model into the frame-buffer under a state wherein the z-buffer is entirely write-protected; and
  a device for rendering the main-model into the frame-buffer under a state wherein the write-protect of the z-buffer is released and updating a memory content of the z-buffer according to depth information of the main-model.

12. The image processing apparatus according to claim 11, wherein the apparatus comprises:
  a device for rendering a background, to be arranged behind the main-model and the sub-model in the virtual three dimensional space in view of a predetermined view point, into the frame-buffer; and
  a device for updating the memory content of the z-buffer according to depth information of the background prior to the rendering of the sub-model.

13. The image processing apparatus according to claim 11, wherein the sub-model is constituted by a size which can give an outline having predetermined width to a periphery of the main-model.

14. The image processing apparatus according to claim 11, wherein the sub-model is an un-similar figure of the main-model.

15. The image processing apparatus according to claim 11, wherein at least one part of the main-model extends off the sub-model.

* * * * *